Nov. 1, 1927.
R. W. PETERSON
ADJUSTABLE AUTO TOOL GRINDER
Filed April 7, 1925    2 Sheets-Sheet 1
1,647,248
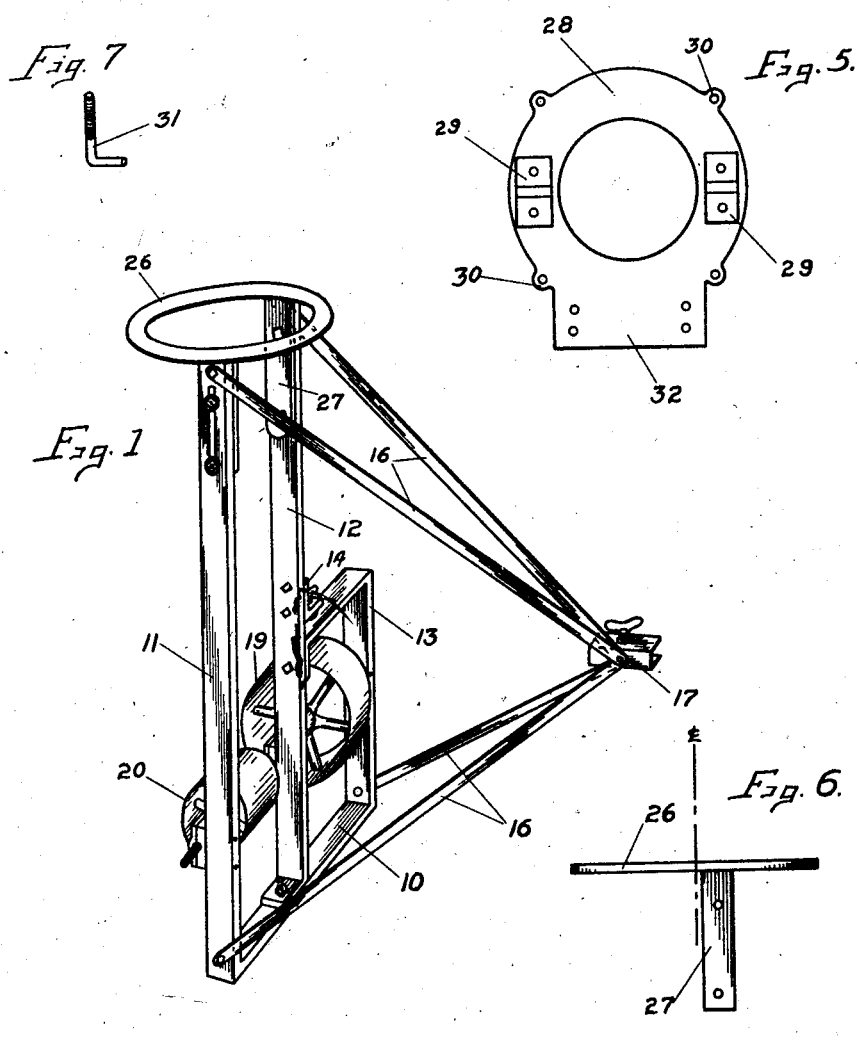
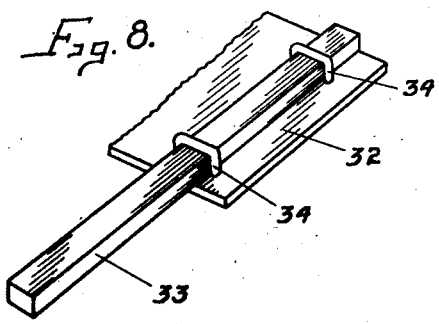
R. W. PETERSON.    INVENTOR.
BY Emil F. Lange
ATTORNEY.

Nov. 1, 1927.
R. W. PETERSON
ADJUSTABLE AUTO TOOL GRINDER
Filed April 7, 1925
1,647,248
2 Sheets-Sheet 2
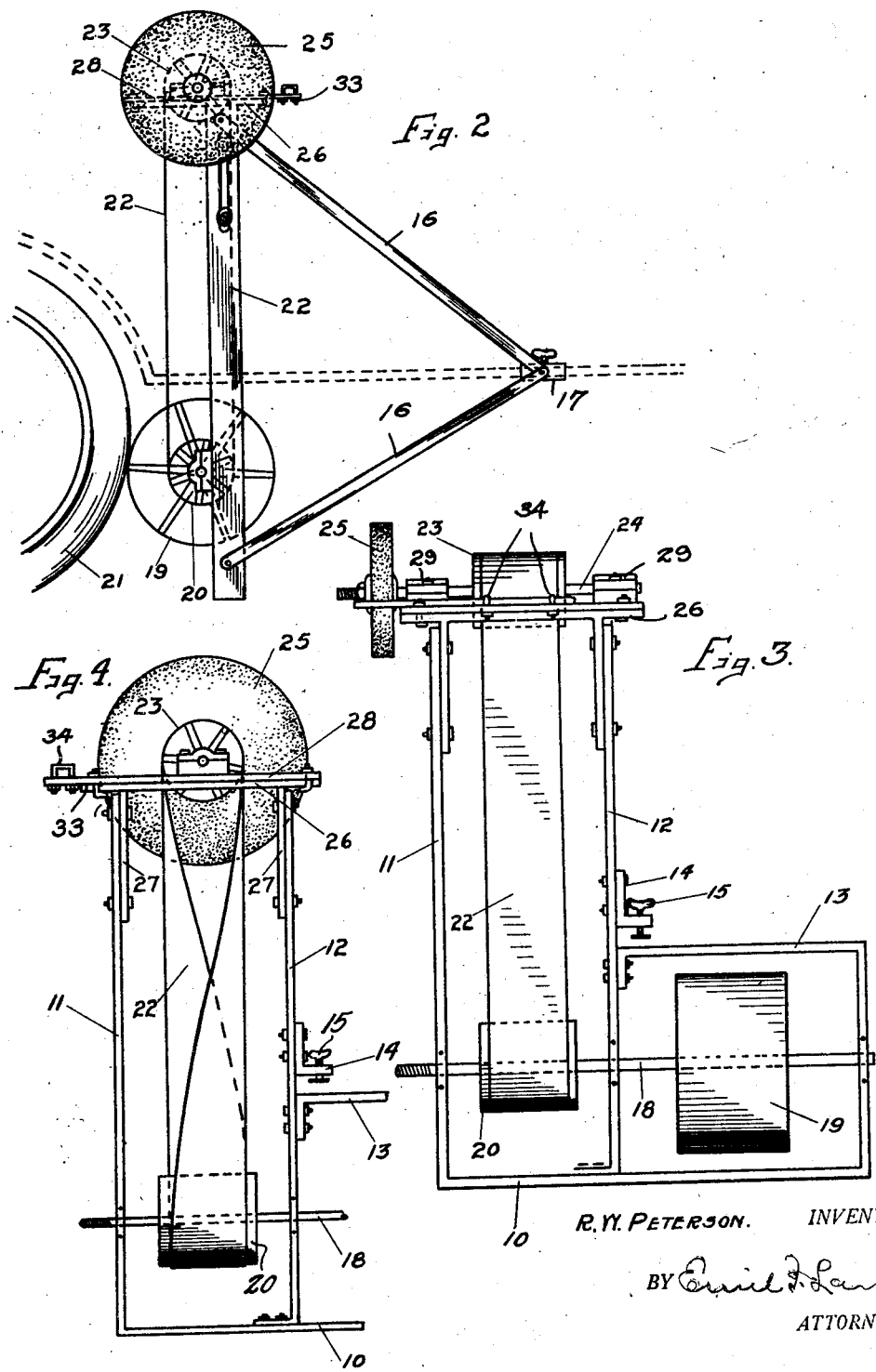

Patented Nov. 1, 1927.

1,647,248

UNITED STATES PATENT OFFICE.

RICHARD W. PETERSON, OF CERESCO, NEBRASKA.

ADJUSTABLE AUTO TOOL GRINDER.

Application filed April 7, 1925. Serial No. 21,372.

My invention relates to the class of devices which are adapted to be attached to an automobile for the purpose of utilizing the power of the automobile for driving a grinding wheel or other rotatable element.

Nearly all modern farms have an automobile but relatively few have stationary engines or portable engines for driving the machinery of the farm. The automobile engine is of course well adapted to supply much of the necessary power but unfortunately the automobile is not designed for delivering power except for propulsion.

The rotatable tool grinder is a necessary part of the equipment of every farm, but such grinders are in most cases designed to be operated either by hand or by foot. The operation of such a grinder is necessarily slow, tedious, and laborious. When operated by hand, the operation of the grinder takes the time and labor of two individuals, one to furnish the power and the other to hold the tool pressed against the grinder. When operated by foot, the grinder draws too heavily on the operator's strength with the result that much of the necessary grinding on the farm remains undone. It is therefore the object of my invention to provide a device which can be manufactured and sold at a relatively low cost, and which can be quickly and easily attached to any automobile in such a way that the power of the automobile engine will be delivered through the rear wheel of the automobile to drive the grinder.

Having in view these objects and others which will be pointed out in the following description, I will now refer to the drawings, in which—

Figure 1 is a view in perspective of a portion of my device, the belt, turntable, and grinding wheel with shaft being omitted for the purpose of more clearly disclosing the details of the frame.

Figure 2 is an elevational view of the device as it appears when attached to the automobile and ready for operation.

Figure 3 is an elevational view of the detached device as seen when looking in the direction of the arrow in Figure 2.

Figure 4 is an elevational view of a portion of the device, similar to Figure 3 but with the shaft of the grinding wheel occupying a position of one quadrant from its Figure 3 position.

Figure 5 is a plan view of the turntable with the platform for the tool rest.

Figure 6 is a view in elevation of the support for the turntable.

Figure 7 is a view of one of the fasteners for securing the turntable in any desired position of adjustment.

Figure 8 is a perspective view of the tool rest and of a fragmentary portion of the turntable, showing particularly the relation between the two.

The frame is best shown in its entirety in Figure 1. A strip of strap iron or similar suitable material is bent into L-shape to form a base 10 and an upright 11. At an intermediate point in the case 10 a second upright 12 is secured thereto by riveting or welding, the uprights 11 and 12 being substantially equal in length and parallel to each other. A second but inverted L-shaped member 13, made from similar material, is secured at its ends to the base 10 and to the upright 12. I may, however, construct the parts 10, 11, and 13 out of a single piece of material as shown in Figure 3, since such construction is stronger and firmer than a joint would be and also since a bend can be produced at lower cost than that of a joint.

The horizontal arm of the member 13 functions to reinforce the frame but it serves also as an abutment for the clamp which secures the grinder to the running board of an automobile. The clamp comprises a short length 14 of strap iron bent into L-shape and secured to the upright 12 as shown in Figure 3, and having a thumbnut 15 or other similar securing device passing therethrough. Braces 16 are secured to the frame at each of the four corners thereof, as shown in Figure 1, and these braces 16 converge and are secured to a clamp member 17. As shown, the clamp 17 consists of a U-shaped device which is adapted to fit over the edge of the running board, and of a thumbnut for engaging the running board on its upper surface. The grinder when secured to the running board by means of the two clamps 14 and 17, is firmly held and braced against accidental slippage due to the vibration of the engine.

The shaft 18 is journalled in journal boxes which are secured to the uprights 11, 12, and 13, and it has two pulleys 19 and 20 secured thereto to rotate therewith. The pulley 19 is a friction pulley and it is designed to be in frictional contact with the rear wheel 21 of the automobile to derive power therefrom when the rear portion of the automobile is jacked up. The belt pulley 20 delivers the power of the shaft 18 through the belt 22 to the pulley 23. The pulley 23 is secured to a shaft 24 which carries the grinding wheel 25 or other similar rotatable element.

The upper portion of my grinder in particular is characterized by several novel features. The turntable support 26 has a pair of depending legs 27 secured thereto, and these legs are adapted to be secured to and between the uprights 11 and 12. The legs are each provided with a pair of bolt holes and the uprights have corresponding slots for receiving the bolts passing through the legs. By raising or lowering the support 26 it is possible to take up slack or otherwise alter the tension of the belt. It should also be noted that the support 26 is eccentrically mounted on the uprights 11 and 12 so that the shaft 24 will at all times be immediately above the shaft 18.

The turntable 28 is shown in detail in Figure 5 and in its relationship to other parts in Figures 2, 3, and 4. It has two journal boxes 29 on its upper surface for receiving the shaft 24. On its periphery there are apertured ears 30, preferably four in number, for receiving the L-shaped bolts 31. These bolts carry nuts on their screw threaded portions and bearing against the upper surface of the turntable, while their lower horizontal portions engage the under surface of the support 26 to hold the turntable secure in any position of adjustment. It is thus possible to shift the grinding wheel into any desired convenient position and to lock it in that position. The turntable has a projection on one side thereof, this projection serving as a support for the tool rest 33 which is secured to the projection of the turntable by means of a pair of U-bolts 34. The tool rest 33 is thus also adjustable into any desired convenient position.

In use, the grinder device is positioned so that the pulley 19 is in close contact with the tire of the rear wheel of the automobile and it is then clamped in this position by means of the thumbnut 15 to the running board. The device is then braced by means of the clamp 17 and also bearing against the running board at its edge. The grinding wheel 25 and the tool rest 33 are then adjusted into a convenient position and locked in that position. The engine of any automobile will be found to have an abundance of power for any grinding job on the farm. It should be noted that the tension or pressure of the tire on the pulley 19 may be adjusted by properly positioning the clamp 15, and that when this position has once been determined it is always possible to secure the same pressure afterward by placing the clamp 15 in the same spot on the running board. This feature is of great importance since the best results can be obtained only when the pressure is neither too great nor too little. When the pressure is too great there is too much wear on the bearings, and when the pressure is too little there is friction and wear on the tire, and in both cases there is loss of power.

With the grinding wheel 25 it is possible to remove rust from or to sharpen any of the hand tools on the farm or in the kitchen, and it is possible also to sharpen many of the larger tools of the farm. For grinding tools and other articles which are too large or heavy to be conveniently lifted, I have made certain slight modifications whereby a portable grinder on a flexible shaft may be driven by the power of the engine through my device. The shafts 18 and 24 are both screw threaded at their outer extremities for receiving the end of the flexible shaft on the portable grinder. In like manner my device may be employed for driving horse clippers or in fact any other tools which may be driven through a flexible or other shaft.

Having thus described my invention in terms which will be readily understood by others skilled in the art to which it pertains, what I claim as new and desire to secure by Letters Patent of the United States is:—

1. A vertical frame having a lateral extension at its lower portion, a securing device between said vertical frame and said lateral extension, said securing device being adapted to secure said frame to the running board of an automobile with said lateral extension positioned underneath the running board, a shaft journalled in said vertical frame and said lateral extension, a pulley on said shaft, said pulley being positioned within said lateral extension and being adapted to frictionally engage the tire of a rear wheel of the automobile, a belt pulley on said shaft, an adjustable turntable at the upper extremity of said vertical frame, a shaft journalled in said turntable and having a belt pulley, a belt connecting said two belt pulleys, and a grinding wheel secured to said shaft on said turntable.

2. A vertical frame having a lateral extension at its lower portion, a securing device between said vertical frame and said lateral extension, said securing device being adapted to adjustably secure said frame to the running board of an automobile with said lateral extension positioned beneath said running board, a clamp for engaging the running board of the automobile at a point remote from said securing device, braces connecting said vertical frame and said lateral extension to said clamp, a shaft journalled in said vertical frame and said lateral extension, a pulley on said shaft, said pulley being positioned within said lateral extension and being adapted to frictionally engage the tire of a rear wheel of the automobile, a belt pulley on said shaft, a shaft journalled in the upper portion of said frame and having a belt pulley, a belt connecting said two belt pulleys, and a grinding wheel secured to said shaft on said turntable.

3. A rotatable tool which is adapted to be supported by and driven by an automobile, a vertical support for said tool, said tool being adapted to rest on the surface of the soil, means on said support for engaging the running board of the automobile, said means being directly above the base of said support and at such a distance therefrom as to support the rear portion of the automobile with one of its rear wheels out of contact with the surface of the soil, a pulley journalled on said vertical support, said pulleys being in contact with the tire of the elevated wheel of the automobile, and means between said pulley and said rotatable tool for driving said rotatable tool.

4. A supporting standard which is adapted to be positioned vertically adjacent the running board of an automobile and with its base resting on the surface of the soil, a lateral extension on said standard for engaging the under side of the running board of the automobile, said extension being at such a height as to maintain a portion of the automobile elevated with one of its rear wheels above the surface of the soil, a pulley on said standard, said standard being adjustable in position to variably press said pulley against the elevated wheel of the automobile, a rotatable tool on said standard, and means between said pulley and said tool whereby said tool will be rotated.

In witness whereof I affix my signature.

RICHARD W. PETERSON.